PHONOGRAPH RECORD PLAYBACK ASSEMBLY

Filed March 27, 1964 3 Sheets-Sheet 1

PHONOGRAPH RECORD PLAYBACK ASSEMBLY

Filed March 27, 1964 3 Sheets-Sheet 2

June 6, 1967 L. J. PAWLIKOWSKI ETAL 3,323,803

PHONOGRAPH RECORD PLAYBACK ASSEMBLY

Filed March 27, 1964 3 Sheets-Sheet 3

United States Patent Office 3,323,803
Patented June 6, 1967

3,323,803

PHONOGRAPH RECORD PLAYBACK ASSEMBLY

Louis J. Pawlikowski, Colonia, and Joseph Guglielmelli, Freehold, N.J., assignors to Westinghouse Electric Corporation, East Pittsburgh, Pa., a corporation of Pennsylvania Filed Mar. 27, 1964, Ser. No. 355,270
1 Claim. (Cl. 274—2)

This invention relates to a phonograph record playback assembly and more particularly to a new and improved "pull-down" phonograph assembly.

In a conventional so-called "pull-down" phonograph, the phonograph record changer or player is mounted in a vertical position when not in use with the turntable and changer assembly facing inwardly of or to the housing or supporting case. The record player is pivotally mounted about a pivot extending horizontally adjacent the lower side of the record changer. When in this position, when the record changer is not being used, the center of gravity of the record changer is inwardly of the pivot so as to normally tend to remain in this substantially vertical position. When it is desired to place the record player into the operating position, the upper outer portion of the record player is pulled outwardly so that the record player will pivot or rotate to a horizontal operating position. Upon rotation of the record player from the vertical position through a predetermined rotation, the center of gravity of the record player is then positioned outwardly of the axis of rotation. Upon further rotation of the record player, the center of gravity of the record player continues to move outwardly in an arcuate path so as to provide an increasing gravitational torque tending to rotate the record changer assembly towards the horizontal position. In most conventional "pull-down" record changers, there is an abutment stop that will stop the rotation of the record changer when it reaches its horizontal position. In a conventional type "pull-down" phonograph, if the record player is allowed to "free fall" into the horizontal position the increasing gravitational torque results in a relatively large impact force when the phonograph record player is stopped in the horizontal position. This relatively large impact force or bump is objectionable for various reasons including possible damage to the record changer mechanism, the tone arm and cartridge and stylus, as well as the noise of the impact and the general shock absorbed by various portions of the phonograph assembly.

One feature of the present invention is a "pull-down" record player assembly wherein the record player is rotatable from the vertical position to a horizontal position for operation thereof with means to prevent the gravitational torque caused by the center of gravity of the record player from passing a relatively large impact force when the record player reaches a horizontal operating position.

Accordingly, an object of the invention is to provide a new and improved "pull-down" phonograph record player which minimizes the gravitational torque of the record player when approaching the horizontal or operating position.

Another object of the invention is the provision of a phonograph record player assembly of the "pull-down" type which can be rotated from a non-operating vertical position to an operating horizontal position with a minimum of shock and wear to the assembly due to the rotation of the record player.

Further objects and advantages of the invention will become apparent as the following description proceeds and features of novelty which characterize the invention will be pointed out in particularity in the claim annexed to and forming a part of this specification.

For a better understanding of the invention reference may be made to the accompanying drawings, in which.

Figure 1:
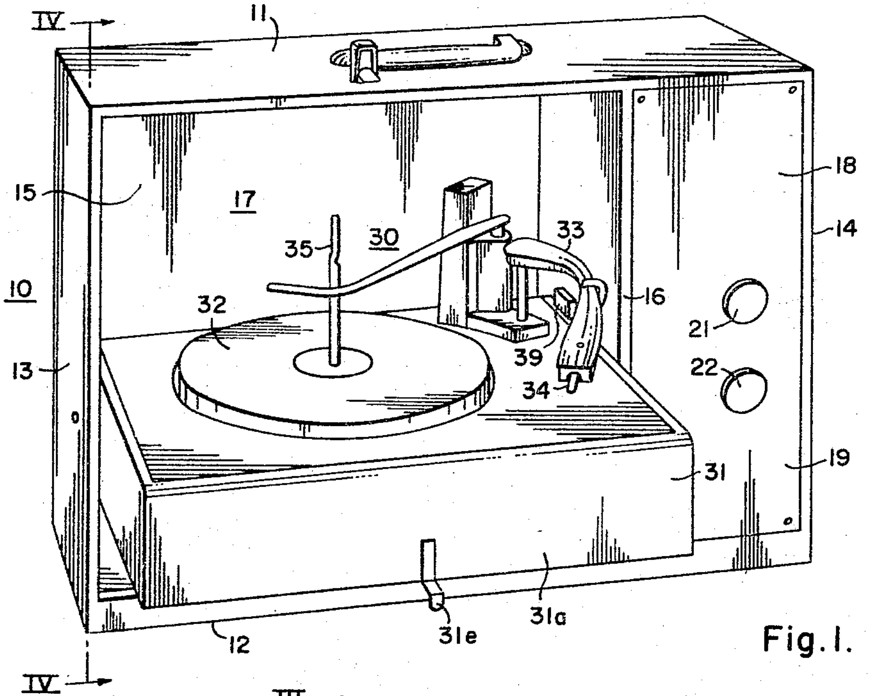
FIGURE 1 illustrates an isometric view of a "pull-down" record player with the record player in the horizontal operating position.
Figure 2:
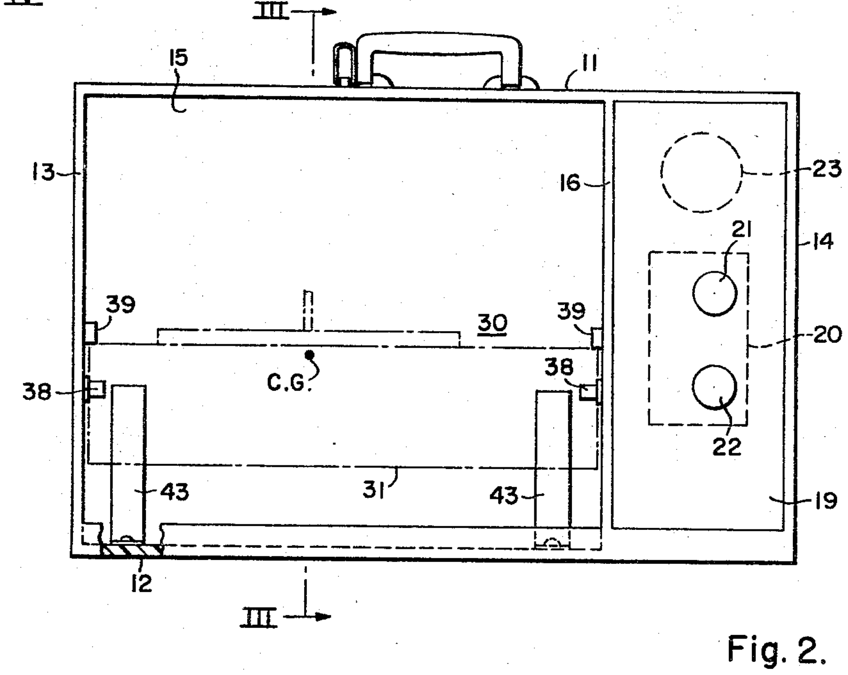
FIG. 2 illustrates a front elevational view of the phonograph record player assembly illustrated in FIG. 1 with the record player illustrated in dotted lines.
Figure 3:
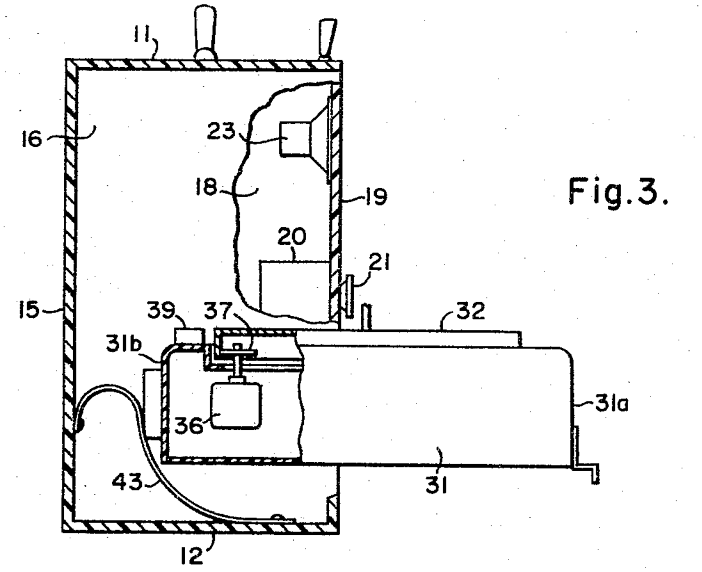
FIG. 3 illustrates a sectional view taken along lines III—III in FIG. 2.

Referring first to FIGS. 1, 2 and 3, there is illustrated a phonograph record playback assembly including a phonograph record player housing or supporting means 10 formed by an upper horizontal wall 11 and a lower horizontal wall 12, which are secured to vertical walls 13 and 14 as well as to a rear vertical wall 15 to form the basic structure for the phonograph supporting means or cabinet. An intermediate dividing vertical wall 16 extends between walls 11 and 12 to divide the compartments into a phonograph record changer compartment 17 and an amplifier speaker compartment 18. The amplifier speaker compartment is defined by walls 14 and 16 and a portion of walls 11, 12 and 15 as well as a front mounting wall 19. Mounted in the amplifier speaker compartment 18 is a conventional audio amplifier 20 mounted on panel 19 in compartment 18 and having appropriate controls such as a volume control 21 and a tone control 22. The output of the amplifier 20 is fed to a speaker 23 which is also mounted on the front mounting panel 19. The electrical output from the phonograph record cartridge of the phonograph record player is applied to the input of amplifier 20 so as to provide acoustical output from the speaker 23. A phonograph record player 30 includes the phonograph or base member 31 which is adapted to support a turntable 32, a pivotally mounted tone arm 33 having a phonograph pickup cartridge 34 for reproducing sound from records which are mounted on spindle 35. This phonograph record player also includes record changer mechanisms not shown in detail but which can be of a conventional type. The turntable 32 is rotated by actuation of a phono-motor 36 which drives an idler wheel 37 so as to rotate the turntable 32 at the appropriate record speed for the record to be played.

The base 31 is rotatably mounted about some suitable pivots 38 (see FIG. 2) which are mounted on vertical walls 16 and 13 so as to enable rotation of the phonograph record player relative to these walls. This thus describes generally the construction of a conventional "pull-down" phonograph record player.

Stops 39 are also mounted on the inner side of vertical walls 13 and 16 so as to abut the upper surface of the base 31 when the record player reaches the horizontal position as shown in dotted lines in FIG. 2. The record player is mounted for rotation about a horizontal axis defined by the pivots 38. This axis is located approximately one quarter to one third forward from the rear portion of the base panel 31.

Figure 6:
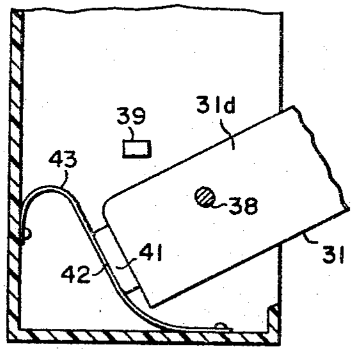
Figure 7:
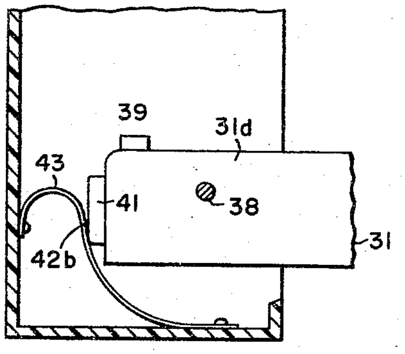
Figure 8:
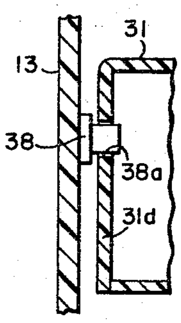
FIG. 8 is a sectional view of the pivoting arrangement used herein.

The base member 31 includes a front rectangular panel **31*a*, a rear rectangular panel 31*b* and side rectangular panels 31*c* and 31*d***, (see FIGS. 4–7). The panel members 31*a*, 31*b*, 31*c* and 31*d* form a rectangular base for supporting the record changer mechanism illustrated in FIGS. 1 and 3. Such a record changer base is conventional and well known in the art. Pivots 38 are coaxially mounted and extend inwardly into the phonograph record compartment 15 from the inside of side panel 13 and the inside of intermediate panel 16. The pins 38 in the normal mounting position extend through apertures 38*a* in side base panels 31*c* and 31*d*, as illustrated in FIG. 8. Such a pin is illustrated in detail in FIG. 8 having an enlarged cylindrical portion which is secured to panel 13 (or panel 16) and reduced cylindrical pin portion extending through the aperture 38*a*. The enlarged circular portion is larger than the aperture 38*a* so as to center the record changer in the record compartment 17, for pivotal movement from a vertical to a horizontal position. The pins 38 and the apertures 38*a* are coaxial to define a horizontally disposed axis about which the record player rotates from a vertical non-operating position to a horizontal operating position as shown in FIGS. 4 through 7. The depth of the base member 31 is defined in FIG. 4 as *b* and the apertures 38*a* in side panels 31*d* are located a distance at (FIG. 5) from the rear panel 31*b*.

Figure 4:
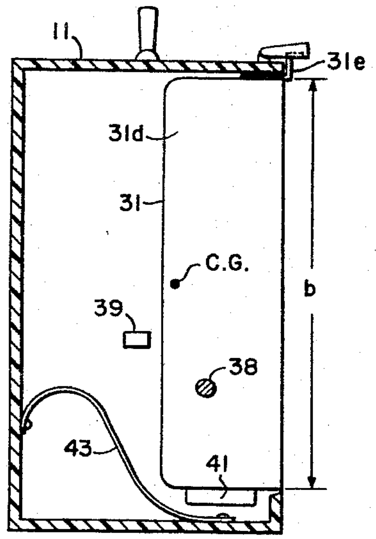
FIG. 4 illustrates a sectional view taken along line IV—IV in FIG. 1, with the phonograph record player assembly in the vertical position.
Figure 5:
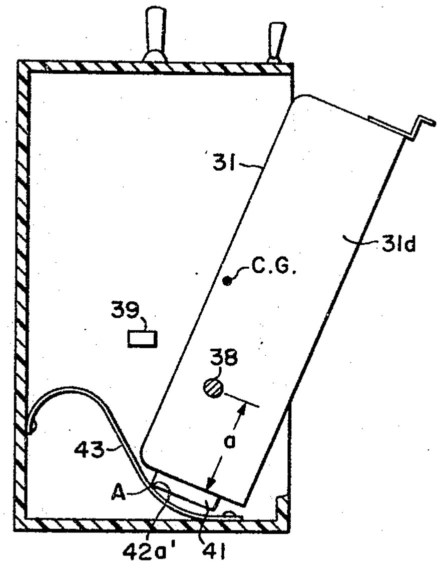
FIGS. 5, 6 and 7 illustrate a sectional view taken along lines IV—IV in FIG. 1 with the record player assembly in various positions rotating to the horizontal or operating position.

The record player 30 has a center of gravity illustrated as C.G. so that when the record player and base are in the vertical position, as shown in FIG. 4, the center of gravity of the base and record player unit is inwardly of the axis of rotation defined by apertures 38*a* and pin 38. Consequently in this vertical position the record player assembly tends to rotate counterclockwise as shown in FIG. 4 so that a latch 31*e* will be in contact with the upper panel 11 so that the record player assembly will be held in a vertical position and will not tend to rotate clockwise toward the operating position.

Figure 9:
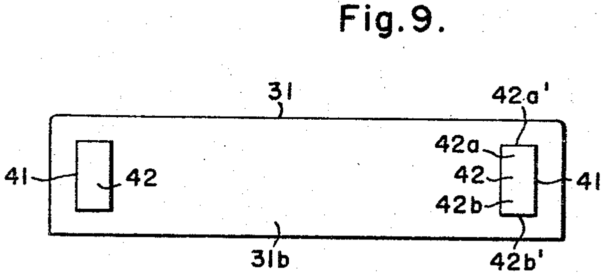
FIGS. 9 and 10 are views showing the friction braking assembly used herein.
Figure 10:
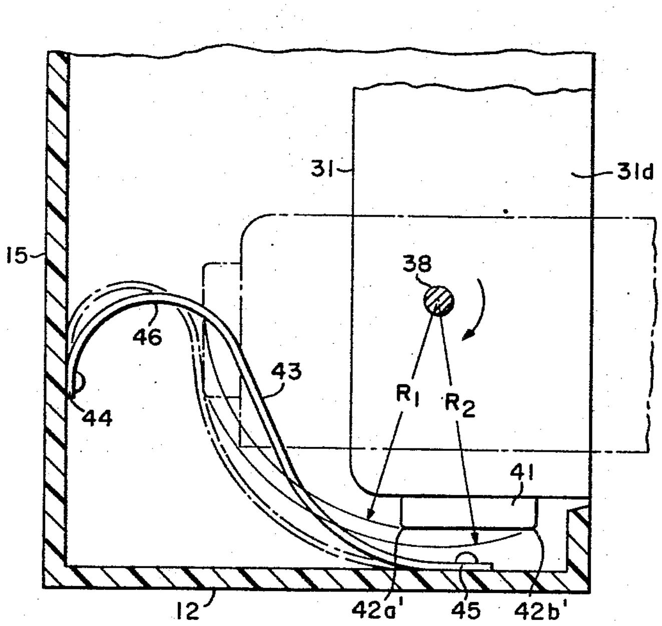

Referring to FIGS. 9 and 10, a friction braking assembly is provided including a pair of rectangularly shaped blocks 41, mounted on the rear base panel 31*b*. These blocks 41 are secured to the panel 31*b* for rotation therewith in response to rotary movement of the phonograph record player. The outer side of the blocks 41 constitute or have a sliding surface 42. For sake of description of operation the upper half of the sliding surface 42 will be defined as the leading sliding surface 42*a*, whereas the lower half will be defined as a trailing sliding surface 42*b*. It will be noted that the trailing sliding surface 42*b*, as shown in FIG. 7, is located below the pivot pin 38 when the record player assembly is in the horizontal operating position. Further, for purposes of description of operation the leading portion 42*a* has a leading edge 42*a'* and the trailing portion 42*b* has a trailing edge 42*b'*.

The friction braking mechanism also includes a pair of leaf springs 43. However, only one spring may be used if desired. Both of these leaf springs 43 are illustrated in FIG. 2 wherein the phonograph record player is illustrated in dotted lines. In FIGS. 4 through 7, the sectional view therein illustrates the single leftmost leaf spring. The axis rotation defined by apertures 38*a* is located near the top of the base 31 as shown in the operating horizontal position in FIG. 7. For this reason the radius of rotation $R_1$, as shown in FIG. 10, of the leading edge 42*a'* is slightly smaller than the radius of rotation $R_2$ of the trailing edge 42*b'* of sliding surface 42. The leaf spring 43 has one end 44 secured to the rear panel 15 with the other end 45 secured to the bottom panel 12. The upper section of spring 43 is positioned in stress to form an upper knee portion 46 and is sloped downwardly to be secured to lower panel 12 at end 45. The spring 43 is shaped and is so associated with the radii $R_1$ and $R_2$, that upon rotation of the record player from its vertical position, shown in FIG. 4, that the leading edge 42*a'* will first contact the spring 43 at a predetermined point. More specifically, this is accomplished by having a lower portion of the spring 43 intersect the circle of rotation of the leading edge 42*a'* at point A (see FIG. 5). In this position the trailing edge 42*b'* does not contact the spring 43 and further the center of gravity C.G. is located outwardly of the pivot defined by aperture 38*a* so as to effect a gravitational force tending to rotate the record player as shown in FIGS. 4 through 7 in a clockwise motion. At this point the friction between leading edge 42*a'* and spring 43 results in a frictional force tending to counteract the gravitational force to rotate the record player clockwise. As the record player is rotated further clockwise by the gravitational force, the torque caused by the gravitational force increases. To counteract this increase of gravitational force, the spring 43 is pushed further inwardly as shown in FIG. 9, to increase the friction between spring 43 and surface 42, and as shown in FIG. 6 in this position the whole sliding surface 42 is contacting frictionally the spring 43. Further rotation bends the spring inwardly creating greater friction between surface 42 and spring 43 so as to counteract the ever-increasing gravitational force. As the surface 42 slides upwardly on the spring 43 towards the knee 46, this compressional force of the spring towards surface 42 continues to increase, since the force of the knee is approaching maximum bending of the spring 43 at the knee 46. As the phonograph record player approaches the horizontal position (FIG. 7), the leading edge 42*a'* and the leading portion 42*a* retracts from contact with spring 43. In the horizontal position, as shown in FIG. 7 in solid lines and in FIG. 10 in dotted lines, the spring 43 remains only in contact with the trailing edge 42*b'* and a portion of the trailing portion 42*b*. Also it will be noted that in this horizontal position a horizontal stop 39 (see FIGS. 2 and 4–7) contacts the upper portion of base 31 to prevent further clockwise rotation of the base.

Since in the horizontal position as shown in FIGS. 7 and 10, the spring 43 is only in contact with the trailing edge 42*b'* and a portion of the trailing portion 42*b*, the contact with spring 43 with surface 42 is positioned below the pivot aperture 38*a*. As a result this frictional contact tends to act as a frictional lock to prevent counterclockwise rotation of the phonograph record player shown in FIG. 10. That is, in the positions of the record player shown in FIGS. 4, 5 and 6 the friction brake acts to prevent or oppose clockwise rotation of the record player. While in the horizontal position, FIG. 7, this friction brake acts to prevent counterclockwise rotation of the record player. As such, this friction braking mechanism operates as a form of shock absorber to prevent rotation of the record player during operation.

While there have been shown and described what are at present considered to be the preferred embodiments of the invention, modifications thereto will readily occur to those skilled in the art. It is not desired, therefore, that the invention be limited to the specific arrangements shown and described and it is intended to cover in the appended claim all such objects as fall within the true spirit and scope of the invention.

We claim as our invention:

A phonograph record playback assembly comprising a phonograph record player having a record turntable, phonograph support means including a base member and a back wall member, said record player pivotally mounted on said support means for rotation about an axis from a vertical position to a substantially horizontal position, the axis of rotation of said record player being located adjacent one side thereof and parallel to said one side, the center of gravity of said record player being situated outwardly from said axis of rotation and said one side thereof, a friction sliding surface on said one side rotatable through a predetermined arc in response to rotation of said record player from a vertical to a horizontal position, said sliding surface having a leading portion and a trailing portion and a substantially planar portion therebetween, a leaf spring mounted on said supporting means adjacent said one side having respective ends secured to said base and back wall members and having a serpentine shape therebetween, a leaf spring end intersecting said arcuate path at a predetermined point and extending between said arcuate path and said axis, said leading portion contacting said leaf spring at said predetermined point in response to rotation of said record player from a vertical toward a horizontal position, and slidable thereon in response to continued rotation of said record changer to a horizontal position in which only said trailing portion contacts said leaf spring, at a point intermediate said vertical and horizontal positions said planar portion of said friction sliding surface engaging over a substantial portion of said leaf spring to counteract gravitational forces in the direction of rotation of said record player.

References Cited

UNITED STATES PATENTS

| | | | |
|---|---|---|---|
| D. 152,710 | 2/1949 | Louchheim | 179—100.12 |
| 1,880,532 | 10/1932 | Thibodeau | 108—134 |
| 1,912,541 | 6/1933 | Racine | 108—134 |
| 3,188,093 | 6/1965 | Meyer | 274—1 |

FOREIGN PATENTS

| | | |
|---|---|---|
| 557,517 | 5/1957 | Belgium. |

NORTON ANSHER, *Primary Examiner.*

C. B. PRICE, *Assistant Examiner.*